United States Patent [19]

Edgar

[11] Patent Number: 5,587,728
[45] Date of Patent: Dec. 24, 1996

[54] OPTICAL FEEDBACK PRINTER

[75] Inventor: Albert D. Edgar, Austin, Tex.

[73] Assignee: International Business Machines Corporation, Armonk, N.Y.

[21] Appl. No.: 235,847

[22] Filed: Apr. 29, 1994

[51] Int. Cl.⁶ .............................. B41J 29/393; B41J 2/21
[52] U.S. Cl. ................................... 347/19; 347/43
[58] Field of Search ...................... 347/237, 240, 347/19, 43; 358/451

[56] References Cited

U.S. PATENT DOCUMENTS

| | | |
|---|---|---|
| 3,868,636 | 2/1975 | Schlang . |
| 4,045,770 | 8/1977 | Arnold et al. . |
| 4,485,737 | 12/1984 | Jeschke . |
| 4,547,784 | 10/1985 | Erlichman et al. . |
| 4,851,927 | 7/1989 | Moriya . |
| 4,878,126 | 10/1989 | Ichikawa .................. 358/451 |
| 4,882,629 | 11/1989 | Faulkerson et al. . |
| 4,926,251 | 5/1990 | Sekizawa et al. . |
| 4,953,015 | 8/1990 | Hayaseki et al. . |
| 4,982,294 | 1/1991 | Morton et al. . |
| 4,990,950 | 2/1991 | Tokuda . |
| 5,104,592 | 4/1992 | Hull et al. . |
| 5,123,023 | 6/1992 | Santarelli et al. . |
| 5,138,347 | 8/1992 | Kun et al. ..................... 347/118 |
| 5,140,431 | 8/1992 | Cardillo ...................... 357/298 |

FOREIGN PATENT DOCUMENTS

| | | |
|---|---|---|
| 0183680A2 | 4/1986 | European Pat. Off. . |
| 0203056A2 | 11/1986 | European Pat. Off. . |
| 2243330 | 10/1991 | United Kingdom . |

*Primary Examiner*—Benjamin R. Fuller
*Assistant Examiner*—Thinh Nguyen
*Attorney, Agent, or Firm*—Jeffrey S. LaBaw

[57] ABSTRACT

A printer for printing an image on a substrate in multiple passes which has a sensor for viewing the existing image on the substrate prior to a printing pass. The sensor scans the image on the substrate; on the first printing pass, it would be the image of the virgin substrate. A set of pixels of the scanned image has a lower intensity that of a corresponding set of pixels in a desired image. The difference between the intensities of corresponding scanned and desired image pixels is used to calculate a set of correction pixels which are printed on the substrate by the printhead. On the next pass, the sensor is used to evaluate the results of a previous pass, and another set of correction pixels are calculated and printed over the first set. Each correction pixel is printed according to the full difference between the image intensities of its corresponding scanned and desired image pixels on the last printing pass and a fraction of the difference on preceding passes.

23 Claims, 10 Drawing Sheets

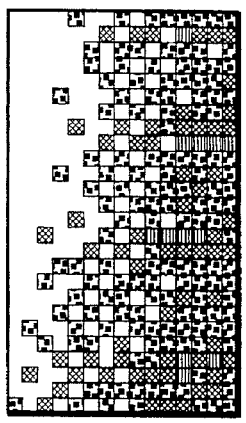
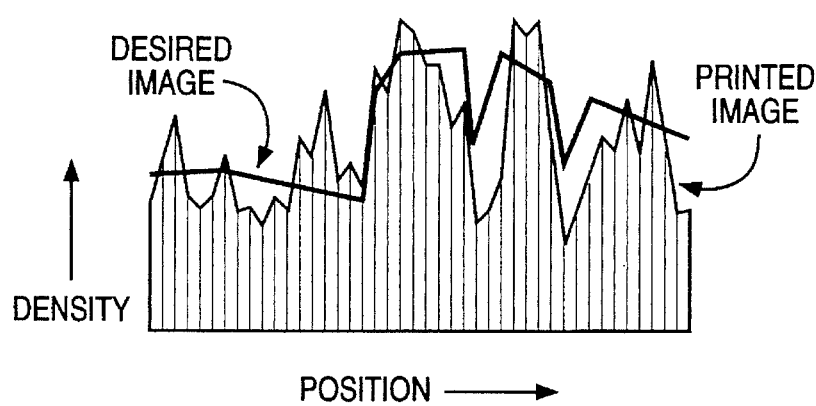
FIG. 1A
PRIOR ART
FIG. 1B
PRIOR ART 5,587,728

OPTICAL FEEDBACK PRINTER

BACKGROUND OF THE INVENTION

This invention relates generally to printing an image on a substrate. More particularly, it relates to an iterative technique of scanning and printing an image on the substrate in successive passes.

There is a substantial body of technology devoted to producing the most accurate images from a printer. Typically, complicated algorithms such as error diffusion and dithering are used so that a printer can come as close to the desired image as possible. Yet despite the body of prior art, to date most printers are basically blind to the image which is actually produced. The printer is limited to a "best guess" as to the appropriate amounts of ink to deposit on the substrate. While the "best guess" has been developed according to the observations of the engineers who developed the printer, it usually represents a compromise between a relatively limited number of images used during printer development. In recognition that some of these compromises may be unacceptable, some printing technologies allow a trained operator to tune parameters based on the actual printer output.

The problems experienced in the prior art are visually depicted in FIG. 1. Most commercially available printers can vary the intensity of a pixel over a limited range. Error diffusion gives the appearance of a full gray scale by varying the ratio of dark pixels, like a Monet painting. Based on the desired image, a calculation is made to determine whether a particular inkjet from an inkjet printhead or wire from a impact printer should fire when the printerhead moves over that particular location on the paper. The desired density of the real image is compared to estimated density of the ink on the paper if the ink was fired at that location. When the inkjet nozzle is fired, the realized density varies widely from the precalculated expected density as shown by the horizontal streaks in FIG. 1. This variance in realized density makes the printed image a noisy image.

The prior art has provided limited optical feedback to a printer. For example, it is known to measure the light produced by an LED or a laser printer to provide corrections during the actual printing operations. In response to the amount of light sensed, adjustments are made by changing the drive current to the LEDs or laser or changing the duration of an exposure period. However, this feedback does not measure what is actually produced on the paper, but provides a means for more accurately controlling the amount of light emitted. Similar feedback techniques exist in the copier art. Another example of combined optical feedback and printing is found in the prior art for registration purposes. Where successive plates of color are used to create an image, for example, in a screen printer, it is known to locate the image printed for registration purposes for the printing of subsequent images. However, no provision is made for correction between the deviation between the desired image and that which is actually printed during a successive printing stage.

The present invention provides a means of correcting printer output based on optical feedback.

SUMMARY OF THE INVENTION

It is therefore an object of the invention to improve the quality of printed images.

It is another object of the invention to provide optical feedback to a printer.

It is another object of the invention to compensate for nonuniformities in the substrate on which the image is printed.

These and other objects of the invention are accomplished by a printer for printing an image on a substrate in multiple passes which has a sensor for viewing the existing image on the substrate prior to a printing pass. The scanned image before each printing pass is used to determine the amount of ink to place on the substrate to obtain a desired image during the current printing pass. The sensor scans the image on the substrate; on the first printing pass, the scanned image is of the virgin substrate. A set of pixels of the scanned image has a lower intensity than that of a corresponding set of pixels in a desired image. The difference between the intensities of corresponding scanned and desired image pixels is used to calculate a set of correction pixels to partially correct this difference. The correction pixels are printed on the substrate by the printhead. On the next pass, the sensor is used to evaluate the results of a previous pass, and another set of correction pixels is calculated and printed. Each correction pixel is printed according to the full difference between the image intensities of its corresponding scanned and desired image pixels on the last printing pass, and a portion of the difference on preceding passes.

The calculation of the correction pixels may be refined so that each of the set of correction pixels is calculated using error diffusion from adjacent pixels. Further, nonuniformities in the substrate may be compensated. Nonuninformities in color and hue of the substrate will be automatically compensated during the first printing pass according the observations of the sensor. It may also be observed that a particular location on the substrate behaves differently than other locations on the substrate in a first printing pass, e.g., does not take ink as readily because of paper fiber nonuniformity or variation in gloss. The correction pixels for that location in subsequent printing passes can be adjusted to compensate for the different behavior.

In one preferred embodiment, the printhead is configured to print a plurality of correction pixels in a linear array. The sensor is positioned proximate to and forward of the printhead so that the image on the substrate is scanned just prior to printing the correction pixels. Both the printhead and the sensor are moved with respect to substrate in a direction orthogonal to the direction in which the print elements in linear array are arranged during a printing pass. Between printing passes, they are moved in a direction parallel to direct the print elements are arranged in the linear array, but in an amount less than the length of the linear array. Thus, the correction pixels printed at a given time by different elements in the printhead belong to different printing passes.

BRIEF DESCRIPTION OF THE DRAWINGS

FIG. 1 depicts a graph of ink density versus position of a desired and printed image as performed by printers in the prior art.

DETAILED DESCRIPTION OF THE DRAWINGS

The present invention relies on optical feedback to provide the most accurate image possible by the printer. In theory, an infinite number of passes could be used. In the embodiment depicted in the accompanying drawings, three passes are depicted. Those skilled in the art would recognize that two, three or more printing passes could be used.

Figure 2A:
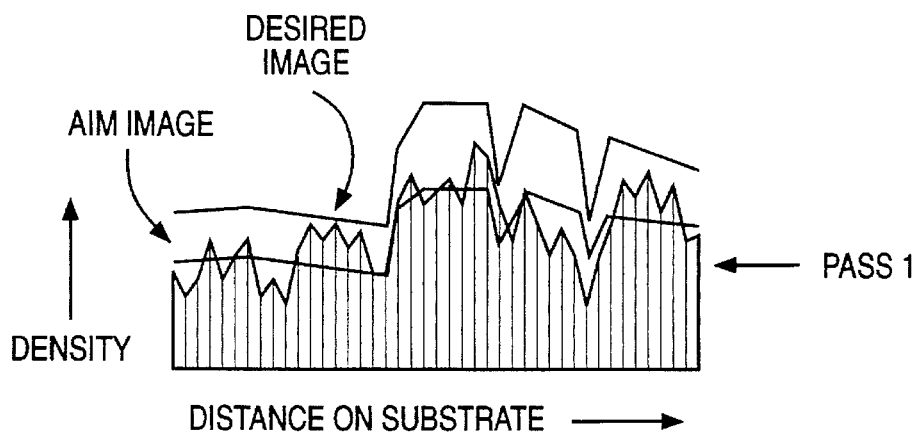
FIG. 2 depicts an ink density versus position graph of three successive passes of a printer which operates according to the principles of the present invention.
Figure 2B:
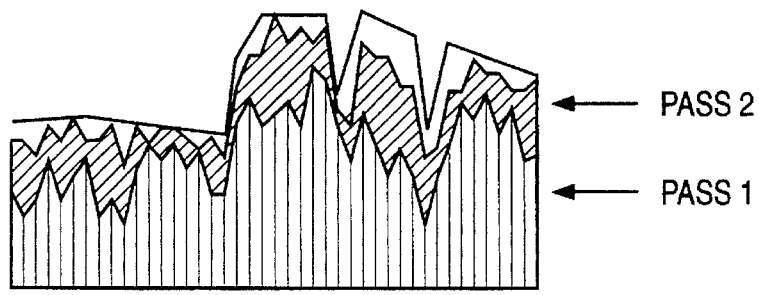
Figure 2C:
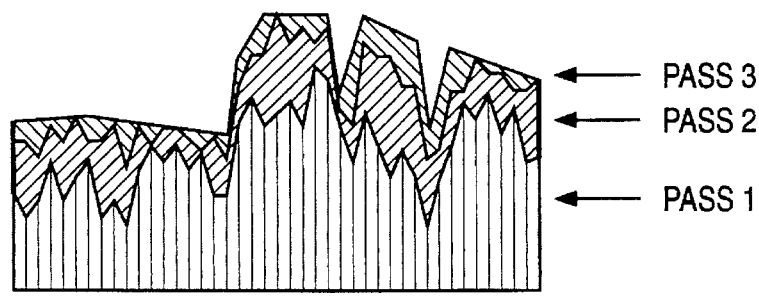

As shown in FIG. 2, the first pass is over a clean substrate, e.g., paper. The first pass prints the initial grainy image. As the printer can only add more ink, the initial grainy image must be fainter than the desired image, so that image which the printer aims to print on the first pass, the aim image, is less than what is ultimately desired. The optimum ratio between the aim image and the desired image is a function of the printer error and the number of passes to follow and may be found empirically for a particular printer. The greater the printer error and number of printing passes the greater the difference between the aim image and the desired image should be. For typical inkjet printers for three passes, a 70 percent ratio between the first aim image and the desired image provides acceptable results. If the ratio is too high, there is a risk of printing a pixel with more than the final desired density on the first pass due to noise, an error that is uncorrectable. If the ratio is too low, convergence to the final desired density is slower, requiring more passes or leaving a larger error to correct without subsequent feedback on the final pass.

A fixed amount of ink will not always produce the same density due to variations in the substrate, such as texture and wicking. Optionally, the algorithm can remember that a piece of substrate under a particular pixel did not print with the expected density on an earlier pass. To the extent this deviation is due to a substrate irregularity, subsequent passes can use this information not only to print the difference between the desired and actual densities, but to multiply this difference by how poorly the paper under the pixel "took" previous applications of ink.

Based on the desired ink density as the printhead moves across the paper, a decision is made to fire or not fire each particular ink nozzle in the printhead. Desired ink density in the aim image is compared to paper density. The present density measured from the paper. The estimated density on the paper if the ink nozzle was fired at that paper location is calculated by adding the expected ink flow to the present destiny. Comparisons are made in linear lumina space and the decision to fire the nozzle is made based on which of the paper densities is closest to the desired density in the aim image. The difference between the desired image and the grainy result of pass one is an error image. The error image by itself would appear to be very grainy as it contains all the errors to be cancelled from the first pass and a relatively small residual of the image. This error image printed is used to print the second pass. However, like the aim image in the first pass, the aim error image in the second pass will be less than the real error image. The image after the second pass is the cumulative result of the first and second passes to allow later passes to fill in.

The difference between the desired image and the image after pass two is a second error image which still has noise, however, the noise is much less as the density of ink added by pass two was less than the density added by pass one. On the last pass, the printer intends to print the full error image with no reduction in intensity. However, as the amount of ink to be added is very small by the last pass, the uncorrected error should also be very small. If the first two passes printed the aim density at 70% of the density difference, the accumulated image on the paper is 91% of the desired density after the second pass, leaving a 9% difference to be corrected on the last pass. The final noise in the image is thus only 9% of the noise of a prior art printer operating without optical feedback.

Through the use of successive printing passes and optical feedback, a more accurate image can be produced than was possible with the prior art.

Like the prior art, error diffusion can be used on each pass to smooth the gray scale of a printer with a limited number of gray steps. At each pixel, the closest realizable gray step is printed. For example, the printer may only be capable of depositing a fixed amount of ink or no ink. There is some expected error between the aim density and the actual paper density after the printing. This error is subtracted from adjacent as yet unprinted correction pixels to cancel it over a small region. As the printhead moves from left to right and top to bottom across the substrate, half the error is subtracted from the pixel immediately to the right of the current position and half from the pixel immediately below. On the bottom row of a particular image, all the error may be subtracted from the pixel to the right.

Figure 3:
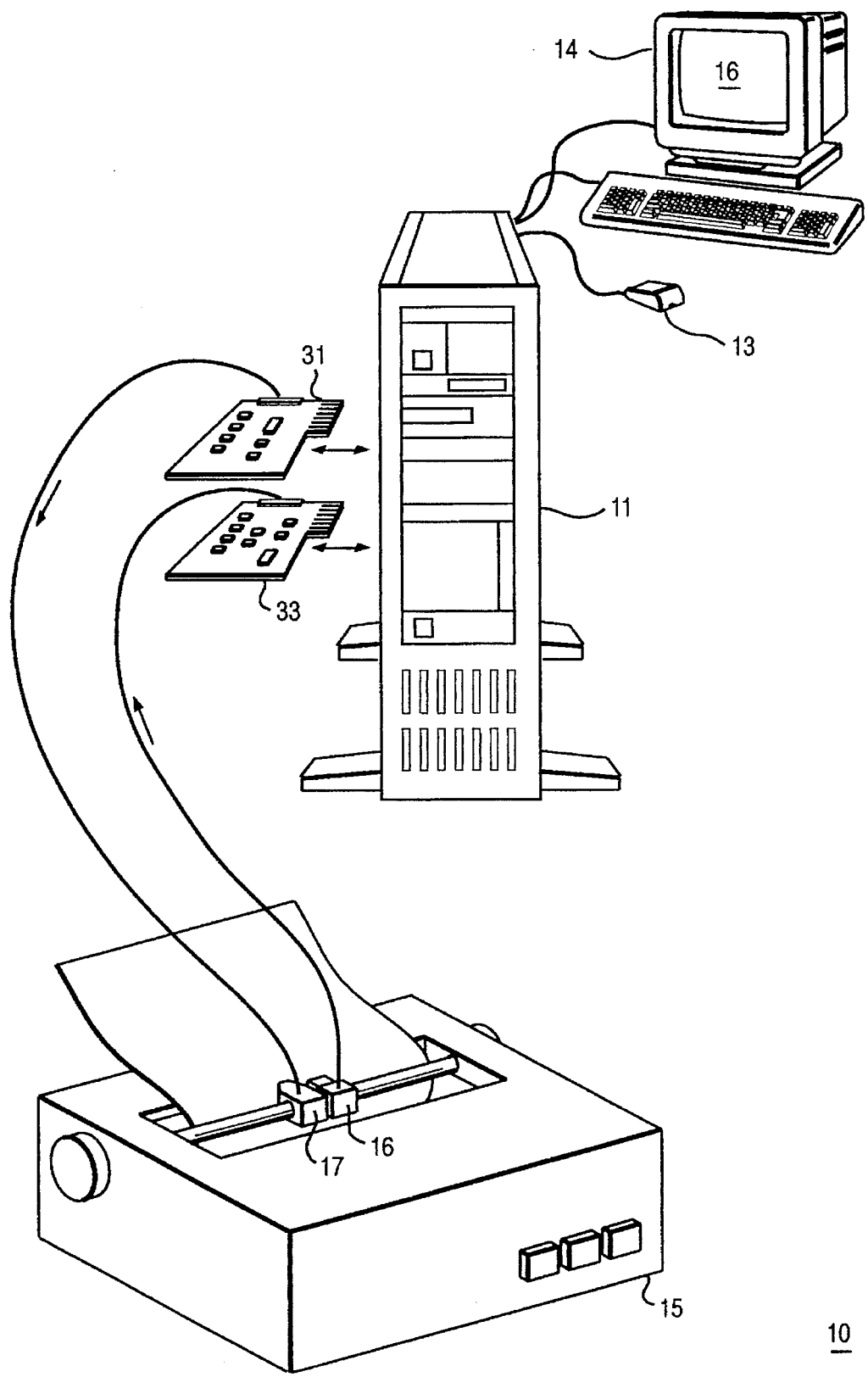
FIG. 3 depicts a printer capable of printing according to the principles of the present invention coupled to a computer comprising system unit, system display keyboard and mouse.

The principles of the present invention can be embodied in a printer coupled to a conventional general purpose computer. In FIG. 3, a computer 10, comprising a system unit 11, a keyboard 12, a mouse 13 a display 14 and a printer 15 are depicted.

The printer technology used must allow ink to build up in multiple passes which excludes technologies such as dye sublimation and laser unless future improvements occur in those printer technologies. An impact ribbon printer is not ideal because in multiple passes some ink transfers back from the paper to the ribbon. Transfer of ink back to the ribbon makes a full gray scale difficult and muddies the colors on a color ribbon. Inkjet technology is well suited to the present invention. In addition, the invention's optical feedback also overcomes some of the problems of inkjet printing, such as micro-mottle caused by wicking in paper fibers. The ink should be less optically dense (more pastel) than used in a typical inkjet printer to allow control over light grays. An ink with less intensity is easily formulated by adding less dye or pigment to the carrier. Multiple passes can be used to build up a strong black.

Figure 4:
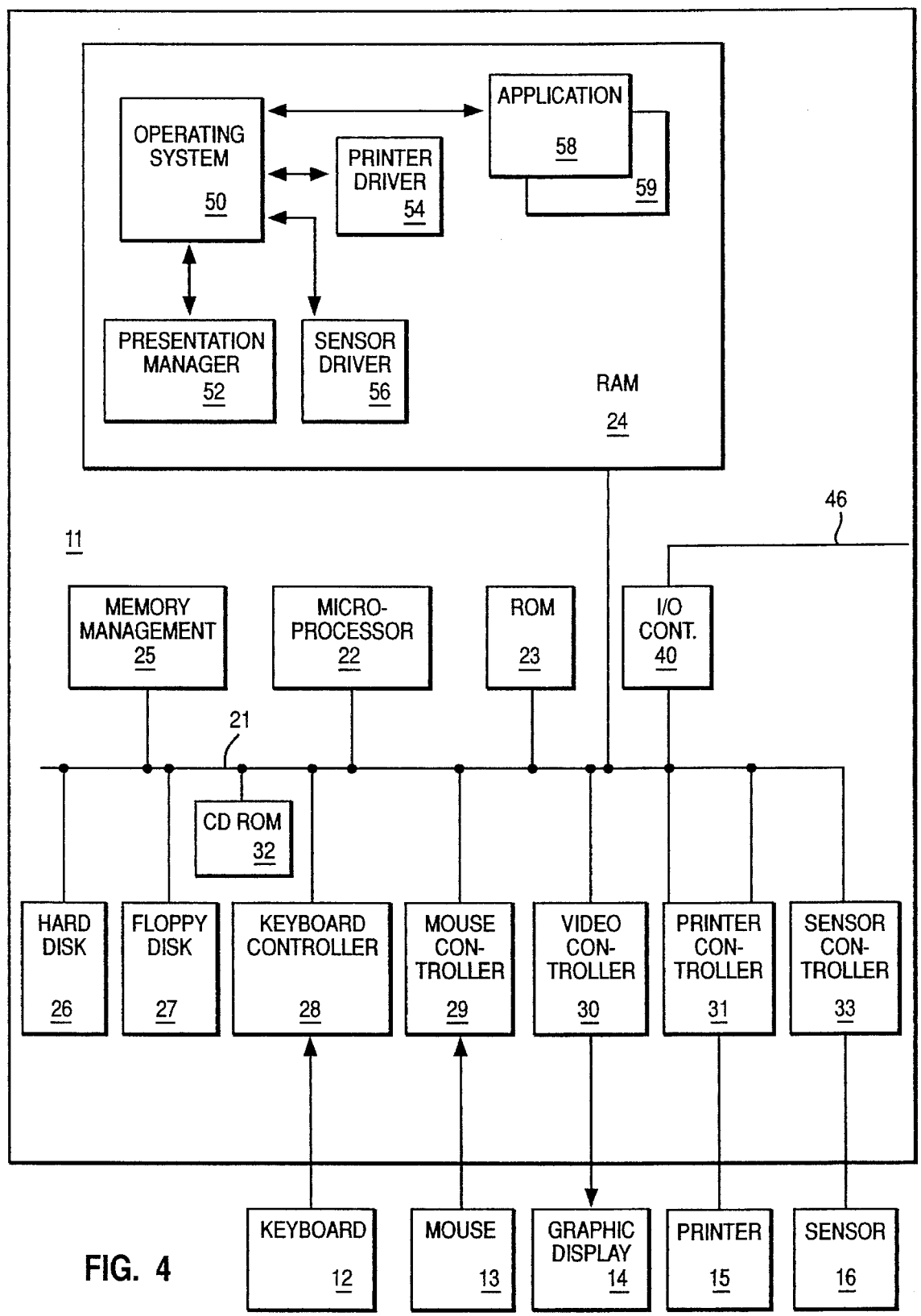
FIG. 4 is a block diagram of the printer and computer combination depicted in FIG. 3.

FIG. 4 shows a block diagram of the components of the personal computer shown in FIG. 3. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, PowerPC Models 601 or 604, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32, also coupled to the system bus 21, is used to store a large amount of data, e.g., a multimedia program or large database.

Also connected to this system bus 21 are various I/O controllers: The keyboard controller 28, the mouse controller 29, the video controller 30, the printer controller 31 and the sensor controller 33. The keyboard controller 28 provides the hardware interface for the keyboard 12, the mouse controller 29 provides the hardware interface for mouse 13, the video controller 30 is the hardware interface for the display 14, and the printer controller 31 is the hardware interface for the printhead 17 and printer 15. The sensor controller 33 is the hardware interface for the sensor 16.

Separate controller cards 31 and 33 are depicted in FIGS. 3 and 4 to control the printer 15 and sensor 16 respectively. Those skilled in the art would recognize that these functions could be provided in a single card or possibly even the motherboard of the computer.

One of the preferred implementations of the present invention is as a set of instructions in a code module resident in the random access memory 24. Until required by the computer system, the set of instructions may be stored in another computer memory, for example, in the hard disk drive 26, in an optical disk for eventual use in the CD ROM 32 or in a floppy disk for eventual use in the floppy disk drive 27. Printer driver 54, and sensor driver 56, are software that insulate the rest of the software from knowing specific hardware requirements of the printer. In one preferred embodiment, the drivers contain software which allows the printer 15 to operate according to the principles of the invention. Alternatively, these functions may be embodied in firmware or hardware in the printer and sensor controllers 31 and 33, or hardware in the printer itself. Applications 58 and 59 provide images to the operating system which are passed to the printer driver, and ultimately printed by the printer 15.

Once received from the operating system, the printer driver defines the image in a plurality of pixels at the pixel resolution at which the printer can deposit ink. Thus, the input image is received at or transformed to the printer resolution so that at each point which the printer can print there is an associated image pixel which has an associated image density.

In one embodiment, the printhead is equipped with a camera mounted to the leading right side of the printhead so that the paper or other substrate is viewed just prior to passing under the printhead. This camera may consist of a vertical array of sensors such as a CCD array, equal in number to and precisely focused at rows corresponding to positions which will be covered by the printhead inkjets. Alternatively, it may contain many more sensors relying on the device drivers of the printer or sensor controller to resolve the image to the printhead inkjet positions. This latter approach is preferred because it eliminates high precision mechanical alignment. A processor located on the sensor controller 33 or alternatively the main processor 22 of the computer will be used together with software to interpret the image seen by the sensor. A queue or other storage means is used to hold the computational result of the image interpretation until the printhead moves over the column of paper that was scanned.

Figure 5A:
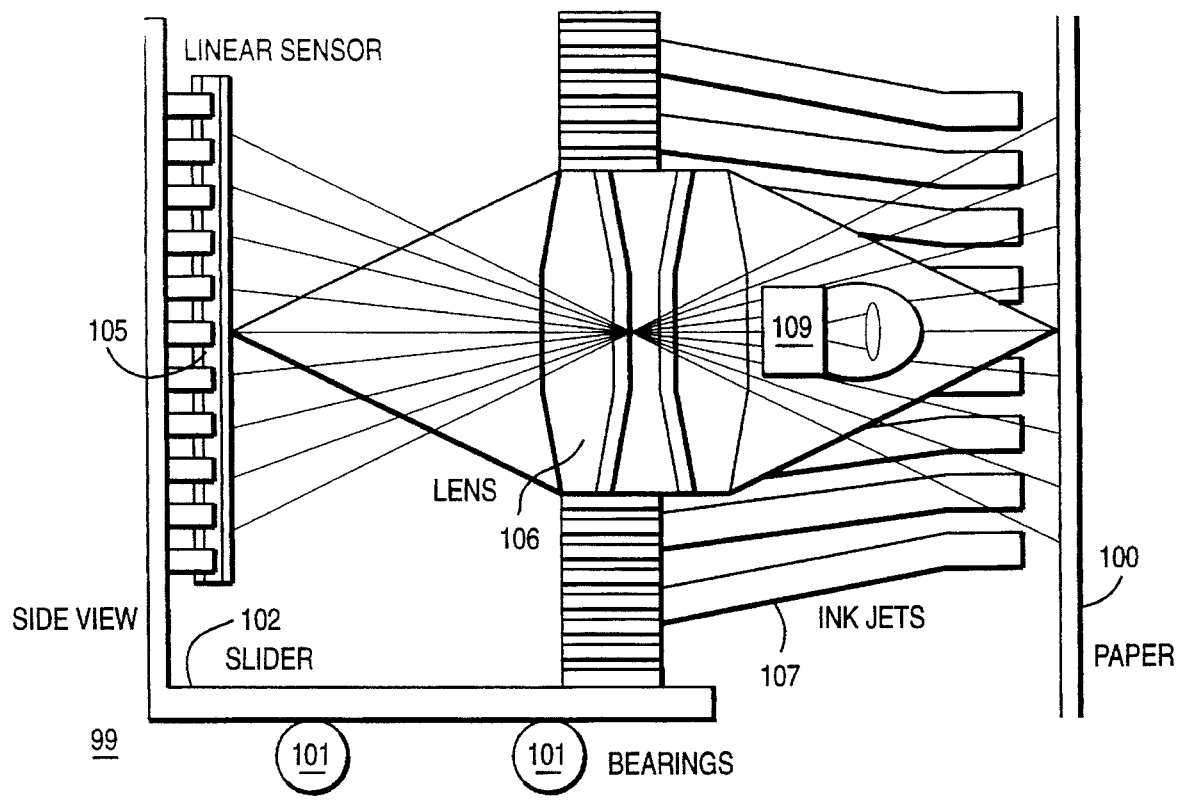
FIG. 5 is a side and top view of the printhead assembly and the printer.
Figure 5B:
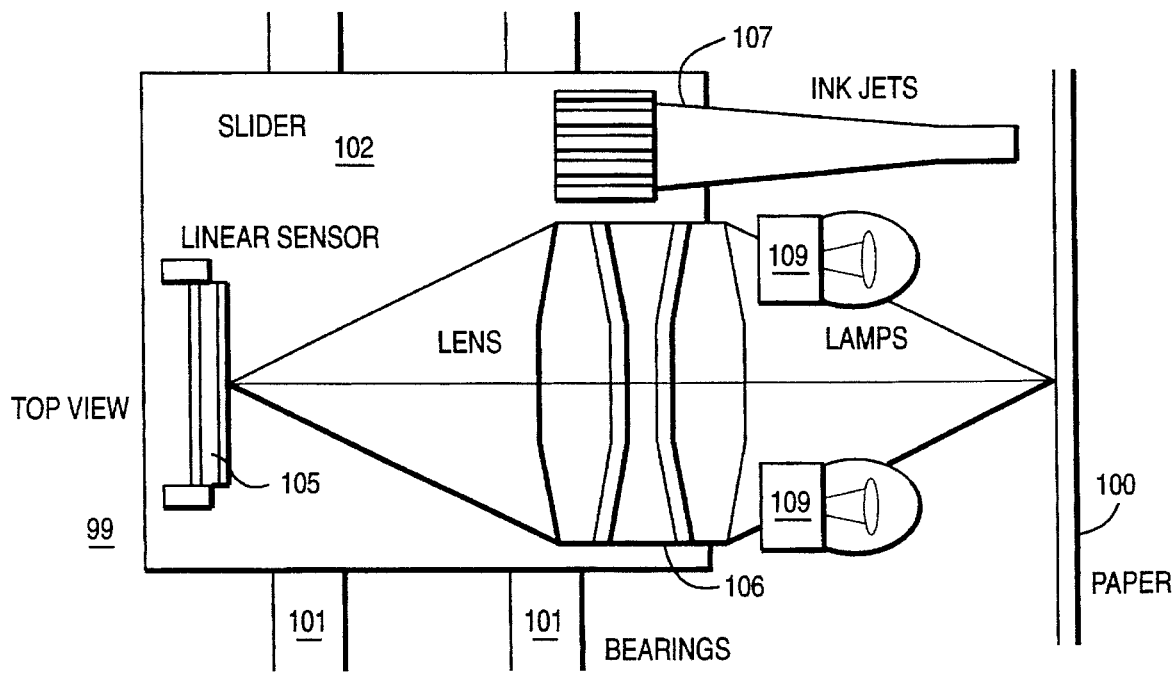

FIG. 5 depicts the printhead assembly 99 in greater detail as it moves across the substrate 100. The printhead assembly 99 slides from left to right over bearings 101 on the slider 102. The sensor 105 and lens 106 precede the inkjet printhead 107. The linear sensor 105 scans a particular area of the substrate 100 through the lens 106. As the printhead 107 passes over the scanned area the inkjets fire. The lamps 109 illuminate the substrate 100 during the scanning process.

Figure 6:
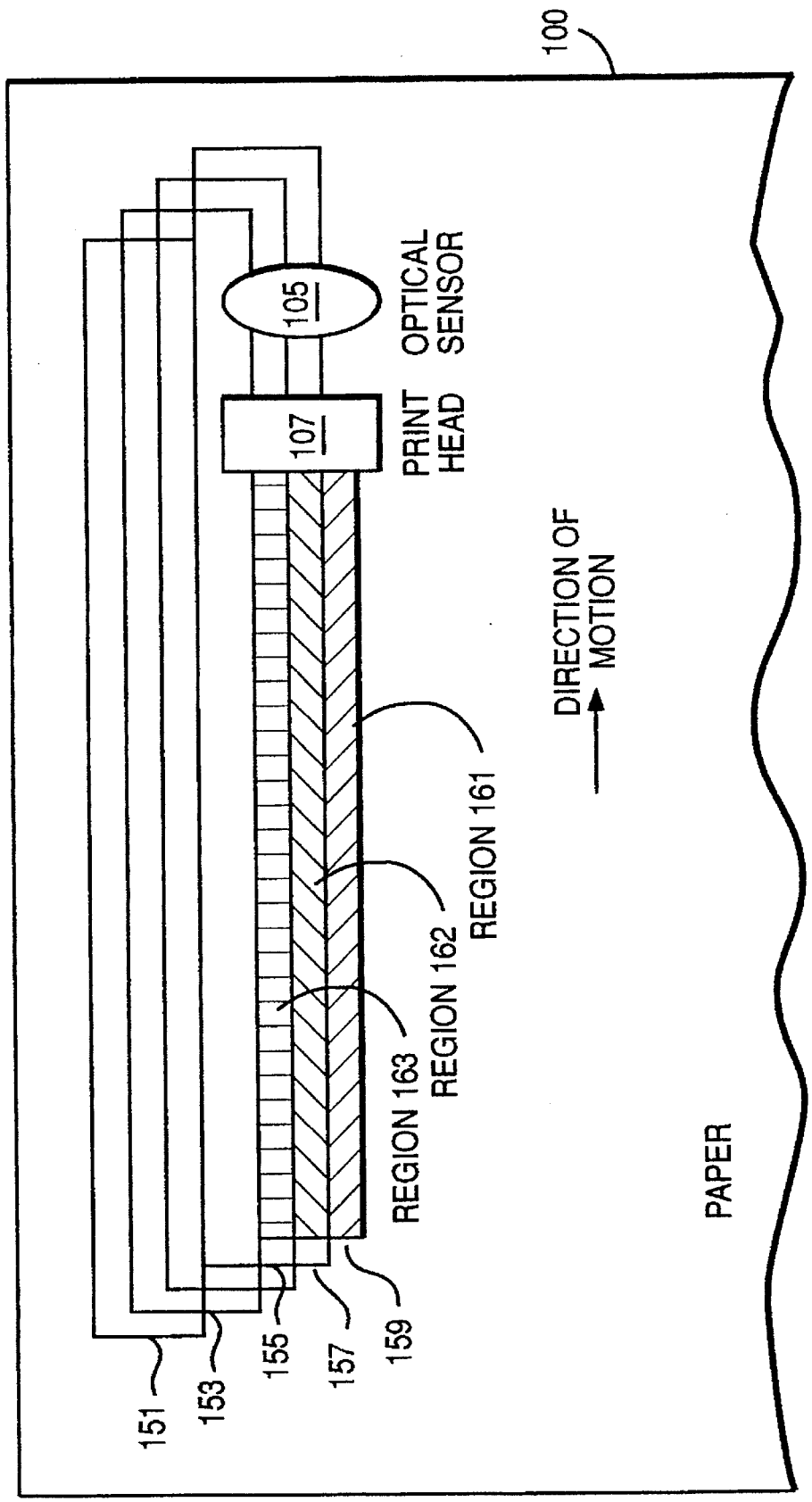
FIG. 6 depicts the printhead as it moves across the paper depicting the three regions of printing.

In one preferred embodiment, depicted in FIG. 6, the printhead of the printer is equipped with nine inkjets in a vertical array. The printhead is passed over the substrate horizontally from left to right. After each horizontal pass of the printhead, the paper is advanced vertically by three printer pixels. Thus, the bottom three printerhead inkjets always pass over unprinted paper, the middle three inkjets provide a second pass over paper which has been printed by the bottom three inkjets, and the top three inkjets pass over the paper for the third and final pass. In an alternative embodiment, the paper could be advanced slightly less than two and two-thirds pixels rather than three printer pixels. By advancing the substrate in this manner, the pixels are placed interstitially to pixels from other passes, thereby removing printer scan line artifacts in the same way interlace removes display scan lines in television.

FIG. 6 depicts the sensor 105 and printhead 107 passing over a substrate such as paper 100 in a series of passes 151, 153, 155, 157 and 159. A slight horizontal displacement is used as an illustrative expedient to make individual passes visible in the figure. In practice this horizontal displacement would be avoided. The printhead is shown over the current pass 159 printing three regions 161, 162 and 163. The inkjets in first region 161 are printing a first pass over fresh paper. Those in the second region 162 are printing a second pass over a region previously printed in previous pass 157. The inkjets in the third region 163, print a final pass over images printed in two previous passes 157, 155.

Figure 7:
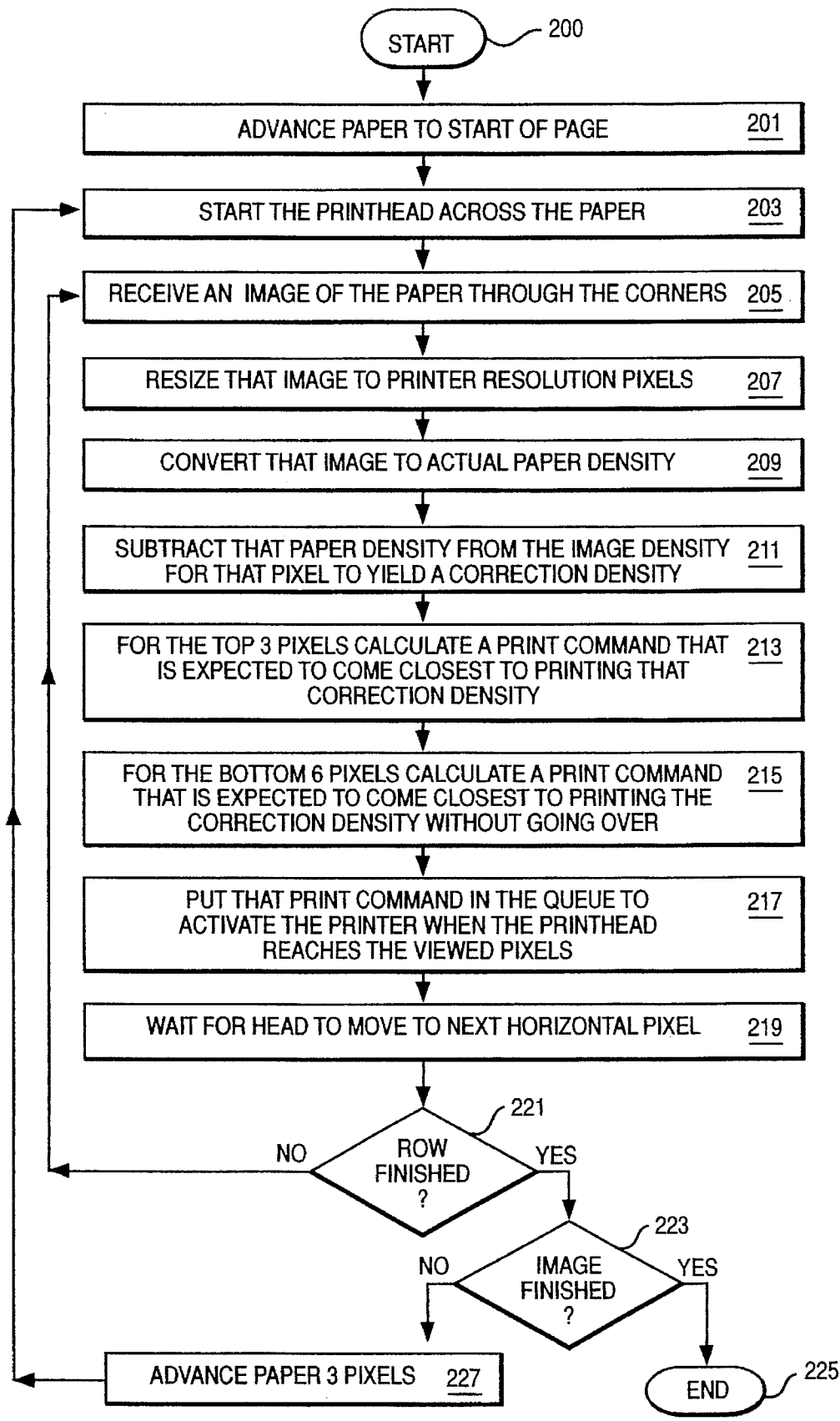
FIG. 7 is a flow diagram of a preferred embodiment of the printer operation.

The printing process is depicted in the flow diagram of FIG. 7. The process begins at step 200 and in step 201 aligns the printhead to the substrate, i.e. advances the paper to a starting position. In step 203, the printhead starts its movement across the paper. In step 205, an image of the substrate is received from the sensor view of the substrate in register with the printhead. In step 207, that image is resized, if necessary, to the resolution of the printer pixels. In step 209, that image is converted into actual paper density. The unit of density may be, for example, the calculated amount of ink to be required to reach that density over plain paper. In step 211, the desired image is retrieved from the computer. For example, the desired image may originate in a publishing application resident in the computer memory. The paper density is subtracted from the desired image density for that particular pixel to yield a correction density, i.e. amount of ink, that when added to the paper density is expected to yield the desired density. In step 213, for the top three pixels, i.e. the last pass, a print command that is expected to come closest to printing the correct density is calculated. In step 215, the bottom six pixels are calculated with a print command which is expected to come closest to printing the correction density without going over, i.e. one that provides somewhat less than the full correction density. This "somewhat less density" is the aim density discussed above, e.g., 70% of full correction. In step 217, the print command is placed in the queue to activate and fire the printer when the printhead reaches the scanned pixels. In step 219, the printer and sensor viewing the substrate wait until the printhead assembly moves over the next horizontal pixel. In step 221, a test is performed to determine whether the row is finished. If not, steps 205 through 219 are repeated. If the row is finished, a test in step 223 determines whether the image is finished. If the image is finished, the process ends in step 225. If not, paper is advanced three pixels and the printhead repositioned, step 227.

Figures 8A, 8B, 8C, 8D, 8E, 8F:
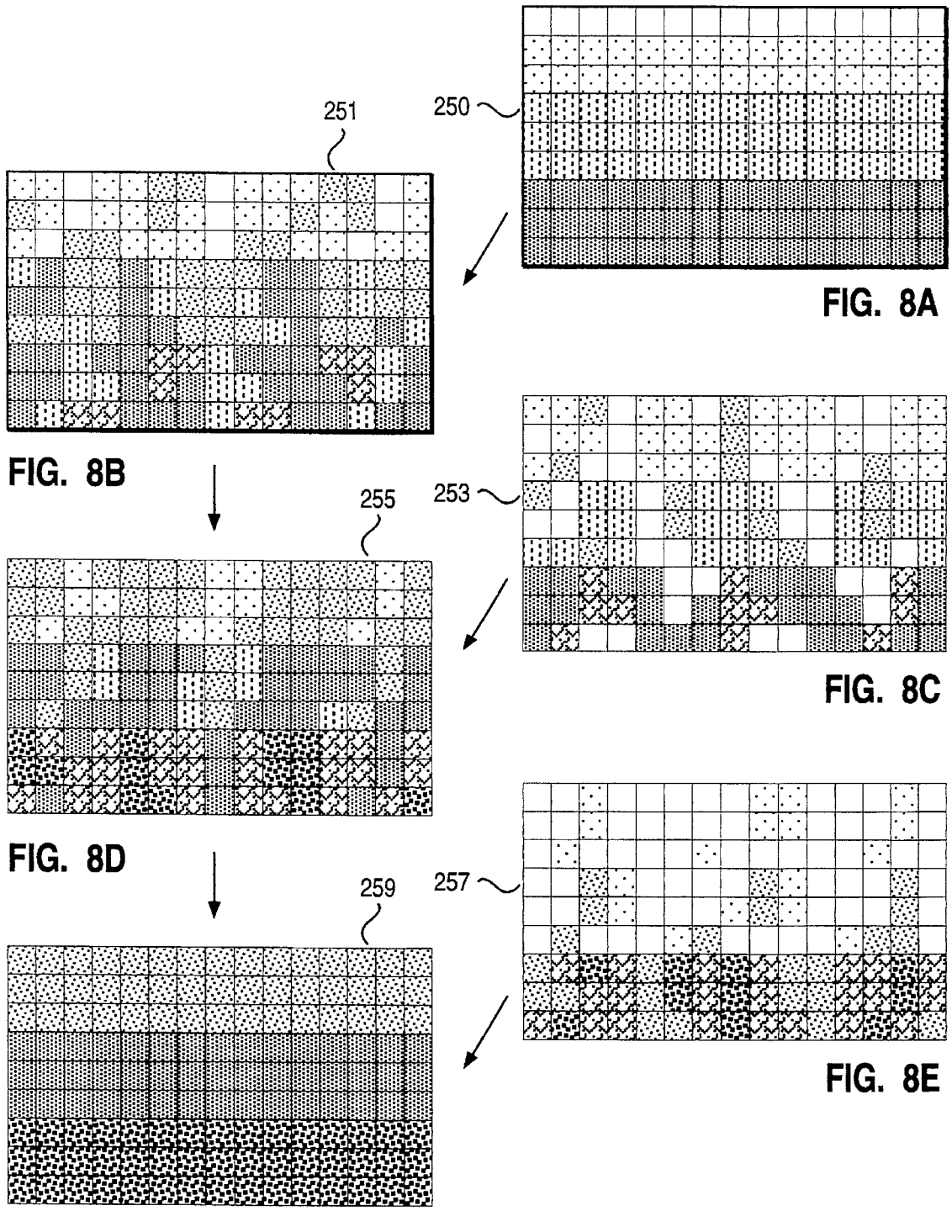
FIG. 8 is a pixel by pixel depiction of the three passes of the printhead.

The printing of three stripes of light gray, mid gray and black is depicted in FIG. 8. The actual ink density deposited on the first, second and third passes is depicted in the right arrays 250, 253 and 257 respectively. The result on the paper after the first, second and third pass is depicted in the left arrays, arrays 251, 255 and 259 respectively. Array 255 shows the accumulated ink from first and second passes 250 and 253. After the third pass 257, the paper should be fairly uniformly striped as shown in the array 259.

The invention could be utilized in bidirectional printing for greater speed but less accuracy than the preferred embodiment discussed above. In alternate passes, the newly printed image would be retained in memory for the next printing pass. This method would require more memory and higher mechanical precision and could give inaccuracies if the wet ink is not finished wicking on the paper when viewed immediately after printing by the trailing camera. Another alternative is to aim the optical sensor directly under the printhead which would enable instantaneous readings to incorporate into the immediate error diffusion mathematics, so that each pass would to some extent correct for its own errors, theoretically giving equal quality in fewer passes. However, in this option, the optics would be very difficult and the instantaneous feedback readings would be made before the wet ink had stopped wicking. Therefore, some "best guess" correction would need to be made to correct for wicking. Wicking is the process of the ink, before it is dry, being pulled through the paper fibers by surface tension.

Figure 9:
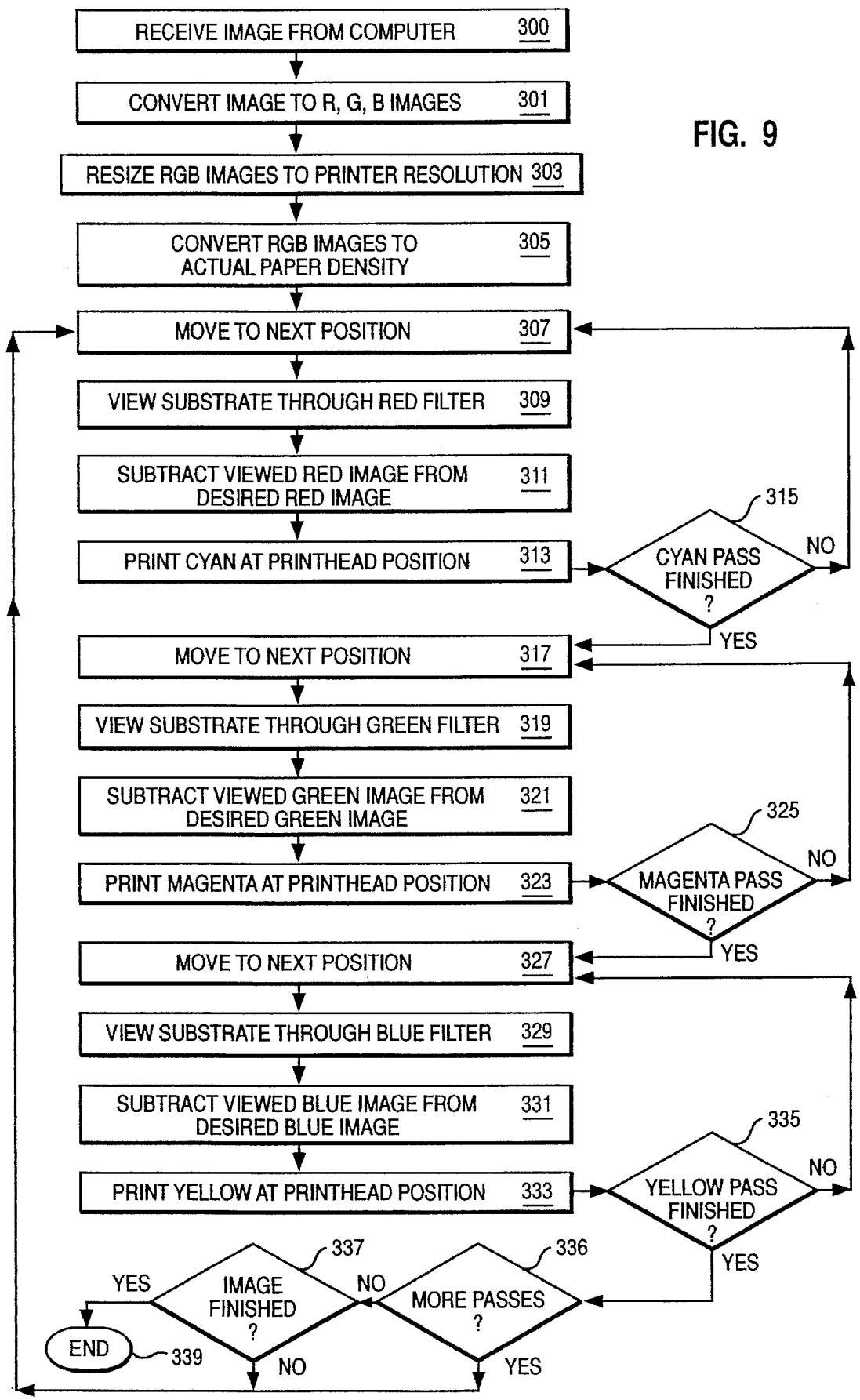
FIG. 9 is a flow diagram for printing three colors according to the invention.

Color may be printed using the method of this invention most simply by making three passes for each iteration. As depicted in FIG. 9, the image from the computer application is received by the printer driver and controller in step 300. The image is converted to separate red, green and blue images in step 301. In step 303, the red, green and blue images are resized to the printer resolution and in step 305 they are converted to actual paper density. In step 307, the printhead and sensor are moved to the next position. At the start of printing, this would be the first position of the substrate. In step 309, the camera views the substrate through a red filter at the current camera position. The printer is configured to transfer cyan ink, and the amount of ink is calculated by the difference between the intensity of the red component of the desired image and the measured red image as sensed by the camera this calculation is stored if the position at which the camera is aimed and that at which the printhead is aimed are not the same. In step 313, cyan is printed at the current printhead position. If there are more positions to be printed in the cyan pass, the process returns to step 307.

Once the cyan pass is completed, the process continues to step 317 where the printhead assembly is moved to the first position in the magenta pass. Generally, this is where the cyan pass began, however, a slight offset may be introduced to place the magenta pixels interstitially with respect to the cyan pixels. In step 319, the camera views the substrate through a green filter. The magenta ink is calculated in step 321 based on the difference between the desired green intensity and measured green intensity through the camera. In step 323, the magenta ink is printed at the current printhead position.

Once the magenta pass is finished, step 325, the printer proceeds to the first position in the yellow pass in step 327. Again this may be identical to the start positions of the cyan and magenta passes or at a slight offset. The substrate is viewed through a blue filter, step 329. The viewed blue image is subtracted from the desired blue image in step 331 and stored as appropriate. Yellow is printed at the printhead position in step 333. In step 335, the printer process decides whether to continue the yellow pass, returning to step 327 or whether the yellow pass is complete. After the first set of cyan, magenta and yellow passes are performed on this portion of the substrate, e.g., at 70% of the desired image intensities, the process returns to step 307 for the second set of cyan, magenta and yellow passes. The process repeats for the second set of passes printing the aim error correction pixels. The printer returns to step 307 for the final pass where the remaining error is printed for the cyan, magenta and yellow passes. In step 337, the printer determines whether the image is complete. Following these three passes, if the image is not finished, the printer head advances as before to the next iteration. If the image is finished, the process ends, step 339. In its simplest form, color is just three monochrome print operations.

In the color embodiment given above, the order in which the colors are printed is important, but not essential. Red/cyan was chosen first because cyan dye undesirably absorbs some green and blue. These undesired crosscolor absorptions can then be nullified by the colors that follow. Green/magenta was chosen second because magenta also affects blue, but has relatively little effect on red. Yellow as chosen last to correct for cross-color effects from the preceding cyan and magenta, while yellow has very little crosscolor effect on the already printed red/cyan and green/magenta. If this order of dye application was not followed, there would be a larger residual error at the end of the three passes. Further iterations would cancel these errors, however, because the errors would, be larger, more iterations would be required for equal quality.

Notice that crosscolor errors are nulled in later iterations. Thus, if the yellow dye were to be substituted with a dye that was slightly orange, i.e. absorbed some green light in addition to the primary blue, subsequent iterations would measure less green through the camera, and thus print less magenta, compensating the orange tint of the yellow dye. Thus, optical feedback produces colors that are accurately repeatable even though the printing dyes vary in color. Because of the human eye's extreme sensitivity to large area color, precise color matching has always been an elusive goal of printing technologies. The optical feedback technology corrects for variation in dye density, hue, and saturation, even paper color, within the gamut limits of the materials chosen. This automatic color accuracy is a significant advance to the art.

As a final example of color printing using optical feedback, consider a camera that views all three colors simultaneously. Each of the three scanned colors is compared to the desired intensity for that color, and the amount of red, green, and blue correction is found as before. These red, green, and blue corrections are used as pointers to a table that gives the empirically derived amount of cyan, magenta, and yellow dyes needed to produce the desired correction. Then these empirically derived amounts are simultaneously deposited on the substrate for all three colors at an aim intensity. Further iterations remove errors as above.

Figure 10:
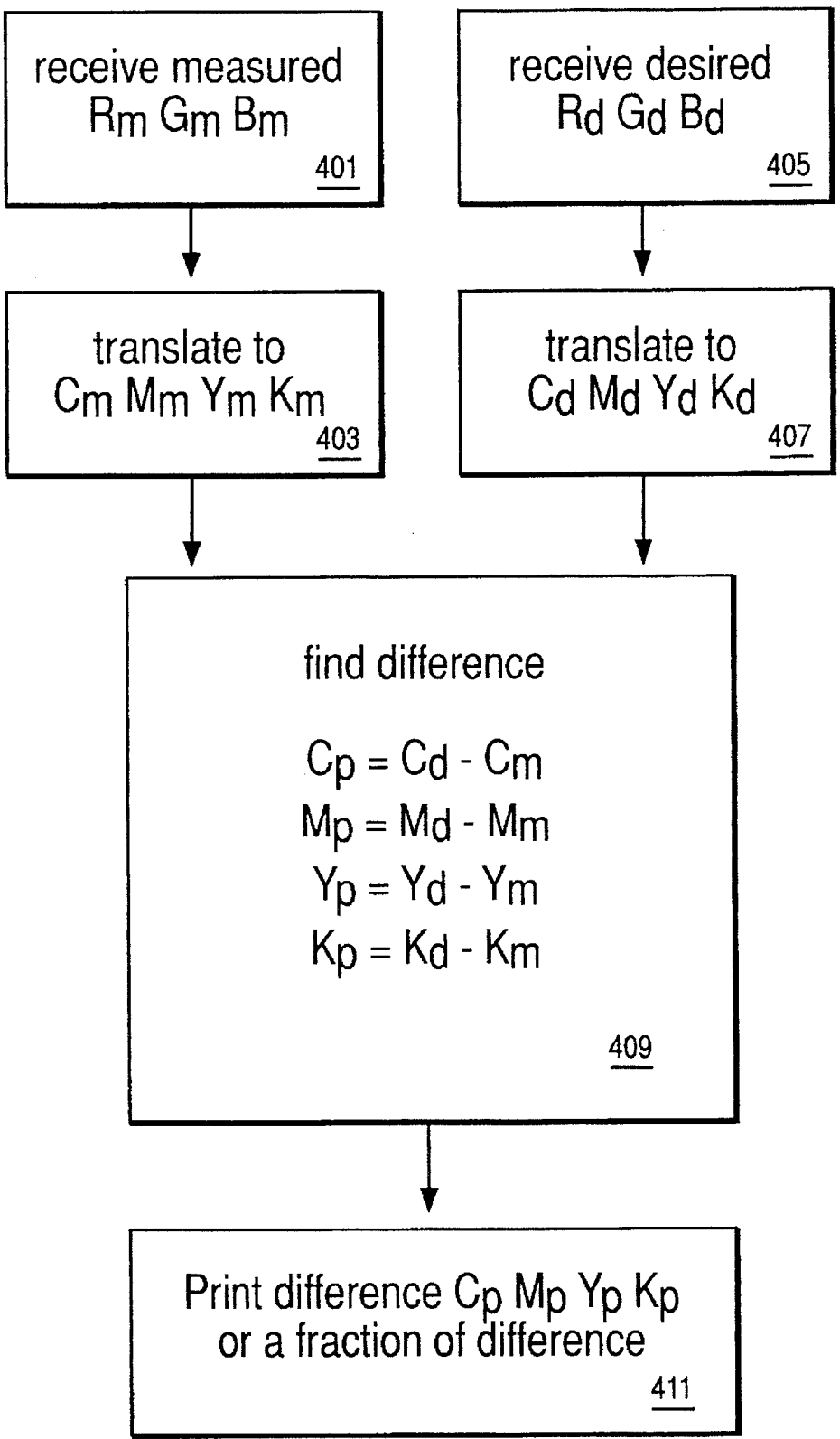
FIG. 10 depicts the process for calculating the amount of ink to be printed in a second color embodiment of the invention.

The method for calculating the amount of ink to be printed in cyan, magenta, yellow, black (CMYK) space is depicted in FIG. 10. After scanning the substrate, the received measured RGB values, $R_m$ $G_m$ $B_m$, step 401, are translated into measured CYMK values, $C_m$ $M_m$ $Y_m$ $K_m$, step 403, for each scanned pixel. The RGB values for the desired image are used to calculate the desired RGB values, $R_d$ $G_d$ $B_d$, step 405. This is translated to CMYK values, $C_d M_d Y_d K_d$ in step 407. The difference between the CYMK values of the desired image and that measured on the substrate $C_p M_p Y_p K_p$, is found in step 409. This $C_p M_p Y_p K_p$ value is used to based on the fractional remainder $R_F$. Actually the lookup array is three dimensional, one dimension for each color, and the interpolation will therefore take place in 3-space. The interpolation formula is: TABLE $(\hat{R}_D, \hat{G}_D, \hat{B}_D)=(1-B_F)\{(1-G_F)[(1-R_F)A(R_Q, G_Q, B_Q)+R_F A(R_Q+1, G_Q, B_Q)]+G_F[(1-R_F)A(R_Q,G_Q+1,B_Q)+R_F A(R_Q+1,G_Q+1,B_Q)]\}+B_F\{(1-G_F)[(1-R_F)A(R_Q,B_Q+1)+R_F A(R_Q+1,G_Q,B_Q+1)]+G_F[(1-R_F)A(R_Q,G_Q+1,B_Q+1)+R_F A(R_Q+1,G_Q+1,B_Q 1)]\}$ where A(R,G,B) is the appropriate one of four array tables for cyan, magenta, yellow, or black.

An example of the four lookup array tables is given below. This example is developed for N=2. At each node four numbers appear, the first is for the C=cyan array, the second for the M=magenta array, the third is for the Y=yellow array, and the fourth is for the K=black array. 00 represents no ink, 20 represents maximum ink, i.e. 00 26 16 00 means no cyan and black ink, maximum magenta, and near maximum yellow ink. The three arguments in the array are in Red, Green, Blue order, i.e. A(1,0,2) means red=1, green =0, and blue =2.

| | | |
|---|---|---|
| A(0,2,2) = 00 26 16 00 | A(1,2,2) = 00 13 07 10 | A(2,2,2) = 02 00 00 20 |
| A(0,1,2) = 00 13 19 00 | A(1,1,2) = 00 00 11 10 | A(2,1,2) = 16 00 11 08 |
| A(0,0,2) = 00 00 25 00 | A(1,0,2) = 13 –3 24 00 | A(2,0,2) = 28 –4 23 00 |
| A(0,2,1) = 00 26 04 00 | A(1,2,1) = 03 16 00 07 | A(2,2,1) = 18 13 00 06 |
| A(0,1,1) = 00 13 07 00 | A(1,1,1) = 00 00 00 10 | A(2,1,1) = 17 00 02 07 |
| A(0,0,1) = 00 00 10 00 | A(1,0,1) = 14 –3 09 00 | A(2,0,1) = 28 –4 08 00 |
| A(0,2,0) = 00 26 –5 00 | A(1,2,0) = 10 26 –6 00 | A(2,2,0) = 29 20 –8 00 |
| A(0,1,0) = 00 13 –3 00 | A(1,1,0) = 14 10 –4 00 | A(2,1,0) = 28 07 –5 00 |
| A(0,0,0) = 00 00 00 00 | A(1,0,0) = 14 –3 –1 00 | A(2,0,0) = 28 –4 –2 00 | print the pixel in step 411. As above, the full value is printed on the last pass and a fraction thereof on preceding.

The translation of the RGB value to CMYK values in steps 403, 407 can be accomplished by using table lookup; although those skilled in the art would recognize that the values could be calculated according to a set of equations instead. First, receive R,G,B in range 0 to 1. Next, calculate approximate equivalent dye densities $\hat{R}_D, \hat{G}_D, \hat{B}_D$: $\hat{R}_D=1-\sqrt{R}$, $\hat{G}_D=1-\sqrt{G}$, $\hat{B}_D=1-\sqrt{B}$ Next, look up dye density in a table using $R_D$, $G_D$, and $B_D$ as pointers. C=Table$_C$ $(\hat{R}_D, \hat{G}_D, \hat{B}_D)$; M=Table$_M$ $(\hat{R}_D, \hat{G}_D, \hat{B}_D)$, Y=Table$_Y$ $(\hat{R}_D, \hat{G}_D, \hat{B}_D)$; K=Table$_K$ $(\hat{R}_D, \hat{G}_D, \hat{B}_D)$ The estimates $\hat{R}_D, \hat{G}_D,$ and $\hat{B}_D$ are not integers, therefore TABLE will be a function using any array lookup.

To find TABLE $(\hat{R}_D, \hat{G}_D, \hat{B}_D)$ four TABLE functions are used, one for C, one for M, one for Y, and K differing only in the actual numbers in the lookup table. For this reason, the algorithm is developed for only one. TABLE$_C$, TABLE$_M$, TABLE$_Y$, and TABLE$_K$ will differ only in the numbers in the elements of the lookup array. $R_Q$=INT $(\hat{R}_D N)$; if $R_Q$=N, then let $R_Q$=N–1 $R_F=\hat{R}_D$ N-$R_Q$ $R_Q$=INT $(\hat{G}_D N)$; if $G_Q$=N, then let $G_Q$=N–1 $G_F=\hat{G}_D$ N-$G_Q$ $B_Q$=INT $(\hat{B}_D N)$; if $B_Q$=N, then let $B_Q$=N–1 $B_F=\hat{B}_D$ N-$B_Q$ Where N is one less than the number of entries per color in the lookup table. N need not be the same for R, G, and B, but it is convenient to think of it this way. $R_Q$, $G_Q$, and $B_Q$ are the actual integer values for the three arguments into the lookup table. For example, if N=3, then $R_Q$, $G_Q$, and $B_Q$ can take on integer values of 0, 1, or 2. $R_F$, $G_F$, and $B_F$ are the fractional parts remaining, and will be used to interpolate between table entries.

$$0 \leq R_F, G_F, \text{ and } B_F \leq 1$$

If, for example, $R_Q$ were=2, then the entry in the array is retrieved for $R_Q$=2, and also the entry for $R_Q$=3. The value returned for TABLE is interpolated between the two entries After interpolation, if there are negative values,
then let N be the strongest negative value,
for example N might be –3
let S be the smallest of black K and –N. Add S to C, M, and Y and subtract S from K Set any numbers that remain negative to 00.

If any numbers are greater than 20, set them to 20. Print CMYK between 00 (no ink) and 20 (maximum ink).

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

I claim:

1. A method for printing an image on a substrate comprising the steps of:

scanning an image on a substrate, wherein a set of pixels of the scanned image has an intensity less than a desired image intensity for a corresponding set of pixels in a desired image; and printing a set of correction pixels on the substrate, wherein each correction pixel is printed according to a difference between image intensities of corresponding scanned and desired image pixels.

2. The method as recited in claim 1 wherein each correction pixel is printed according to a fraction of the difference between the image intensities of corresponding scanned and desired image pixels.

3. The method as recited in claim 2 wherein the scanning and printing steps are repeated iteratively so that multiple sets of correction pixels are printed on a given area on the substrate.

4. The method as recited in claim 3 wherein each correction pixel is printed according to the difference between the image intensities of corresponding scanned and desired image pixels on a last printing step.

5. The method as recited in claim 2 wherein each of the set of correction pixels is calculated using error diffusion from adjacent pixels.

6. The method as recited in claim 3 wherein a plurality of correction pixels are printed in a linear array and at least one pixel of the plurality of correction pixels is printed on a blank area of the substrate and other pixels of the plurality of correction pixels are printed on areas of the substrate where other correction pixels have been printed.

7. An apparatus for printing an image on a substrate comprising:
   a sensor for scanning an image on a substrate, wherein a set of pixels of the scanned image has an intensity less than a desired image intensity for a corresponding set of pixels in a desired image; and
   a printhead for printing a set of correction pixels on the substrate, wherein each correction pixel is printed according to a difference between intensities of corresponding scanned and desired image pixels.

8. The apparatus as recited in claim 7 wherein the sensor and the printhead are moved over and parallel to the substrate for iterative scanning and printing passes at respective pixels on the substrate, and each correction pixel is printed according to the difference between the image intensities of corresponding scanned and desired image pixels on a last printing pass and each correction pixel is printed according to a fraction of the difference of the image intensities of corresponding scanned and desired image pixels on preceding printing passes.

9. The apparatus as recited in claim 8 further comprising:
   a memory for storing the scanned image and the desired image;
   a processor for calculating the difference between the scanned image and the desired image and issuing commands to the printhead for printing the set of correction pixels.

10. The apparatus as recited in claim 9 wherein each of the set of correction pixels is calculated using error diffusion from adjacent pixels.

11. The apparatus as recited in claim 8 wherein the printhead at a given position over the substrate prints a plurality of correction pixels in a linear array on the substrate and the printhead is moved in a direction orthogonal to the linear array and parallel to the substrate during a printing pass and the printhead is moved in a direction parallel to the linear array and parallel to the substrate between printing passes so that at least one pixel of the plurality of correction pixels in the linear array is printed on a blank area of the substrate and other pixels of the plurality of correction pixels in the linear array are printed on areas on the substrate where correction pixels were printed in preceding printing passes.

12. The apparatus as recited in claim 11 wherein the sensor is positioned proximate to and forward of the printhead in the direction of a printing pass so that the image on the substrate is scanned just prior to printing the correction pixels.

13. The apparatus as recited in claim 8 which further comprises means for observing that a location on the substrate absorbs differently than other locations on the substrate in a first printing pass and means for adjusting correction pixels for that location in subsequent printing passes to compensate for the different absorption.

14. The apparatus as recited in claim 8 wherein the printhead prints in color and for each printing pass, there are a set of cyan correction pixels, a set of magenta correction pixels and a set of yellow correction pixels.

15. The apparatus as recited in claim 11 wherein the sensor and the printhead are moved between printing passes in noninteger multiples of the spacing between correction pixels so that the correction pixels on the successive printing passes are interleaved.

16. A method for printing a color image on a substrate comprising the steps of:
   scanning an image on the substrate, wherein a set of pixels of the scanned image has an intensity less than a corresponding set of pixels in a desired image;
   calculating a set of differences between the intensities of corresponding pixels in the desired and scanned images; and
   printing on the substrate a first set, a second set and a third set of correction pixels composed of a first, a second and a third pigment respectively, wherein each correction pixel is printed according to the set of differences.

17. The method as recited in claim 16 wherein the scanning step further comprises the steps of successively scanning the image with a first, a second and a third filter which respectively pass a first, a second and a third color of light and the calculating step further comprises the steps of calculating a first, a second and a third set of differences between the intensities of corresponding pixels in the desired and scanned images in the first, second and third colors.

18. The method as recited in claim 17 wherein the first, second and third colors are red, green and blue respectively and the first, second and third pigments are cyan, magenta and yellow respectively.

19. The method as recited in claim 18 wherein the cyan correction pixels are printed in a first printing pass, the magenta correction pixels are printed over the cyan correction pixels in a second printing pass and the yellow correction pixels are printed over the cyan and magenta correction pixels in a third printing pass.

20. The method as recited in claim 16 wherein the scanning step scans for a first, a second and a third color of light concurrently and the calculating step further comprises the steps of calculating a first, a second and a third set of differences between the intensities of corresponding pixels in the desired and scanned images in the first, second and third colors.

21. The method as recited in claim 20 which further comprises the steps of:
   storing a table of correction values in a memory;
   retrieving correction values from the table for the first, second and third set of correction pixels according to the first, second and third set of differences; and
   concurrently printing the first, second and third set of correction pixels according to the retrieved correction values.

22. The method as recited in claim 16 wherein the scanning, calculating and printing steps are repeated iteratively.

23. The method as recited in claim 22 wherein each correction pixel is printed according to the difference between the image intensities of corresponding scanned and desired image pixels on a last printing step and a portion of the difference on preceding printing steps.

* * * * *